(12) United States Patent
Melzer et al.

(10) Patent No.: US 6,305,609 B1
(45) Date of Patent: *Oct. 23, 2001

(54) DATA CARD, PROCESS FOR MANUFACTURING A DATA CARD AND APPARATUS FOR MANUFACTURING A DATA CARD

(75) Inventors: Roland Melzer, Schwelm; Detlef Houdeau, Langquaid, both of (DE)

(73) Assignee: Infineon Technologies Ag, Munich (DE)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/123,082

(22) Filed: Jul. 27, 1998

Related U.S. Application Data

(63) Continuation of application No. PCT/DE97/00118, filed on Jan. 23, 1997.

(30) Foreign Application Priority Data

Jan. 26, 1996 (DE) .............................................. 196 02 821

(51) Int. Cl.$^7$ .................................................. C06K 19/00
(52) U.S. Cl. ........................... 235/487; 235/492; 29/592; 156/300
(58) Field of Search ..................................... 235/487, 488, 235/492, 380; 174/52.2; 29/592, 883, 846; 156/298, 300, 311

(56) References Cited

U.S. PATENT DOCUMENTS

| | | | |
|---|---|---|---|
| 4,146,417 | * | 3/1979 | Drelich et al. .................... 156/62.2 |
| 4,587,413 | * | 5/1986 | Hoppe et al. ......................... 235/492 |
| 4,788,102 | * | 11/1988 | Koning et al. .......................... 428/40 |
| 4,927,983 | * | 5/1990 | Jones et al. ............................ 174/258 |
| 5,244,840 | * | 9/1993 | Kodai et al. ........................... 235/492 |
| 5,448,110 | * | 9/1995 | Tuttle et al. ........................... 257/723 |
| 5,598,032 | * | 1/1997 | Fidalgo ................................. 235/492 |
| 5,817,207 | * | 10/1998 | Leighton ............................... 156/298 |
| 5,837,992 | * | 11/1998 | Onozawa .............................. 235/488 |
| 5,852,289 | * | 12/1998 | Masahiko ............................. 235/492 |
| 5,962,840 | * | 10/1999 | Haghiri-Tehrani et al. ......... 235/492 |
| 5,986,890 | * | 11/1999 | Hoppe et al. ......................... 361/737 |

FOREIGN PATENT DOCUMENTS

| | | |
|---|---|---|
| 81 22 540.7 | 1/1983 | (DE) . |
| 35 35 791 A1 | 5/1986 | (DE) . |
| 42 18 923 A1 | 10/1992 | (DE) . |
| 195 04 194 C1 | 4/1996 | (DE) . |
| 0 503 730 A1 | 9/1992 | (EP) . |
| 2 095 175 A | 9/1982 | (GB) . |
| 2 279 907 A | 1/1995 | (GB) . |

\* cited by examiner

*Primary Examiner*—Karl D. Frech
*Assistant Examiner*—Daniel St. Cyr
(74) *Attorney, Agent, or Firm*—Herbert L. Lerner; Laurence A. Greenberg; Werner H. Stemer

(57) ABSTRACT

A data card includes a card body having at least one card top layer and at least one card bottom layer. The outer dimensions of the top and bottom card layers correspond to one another, and a module element is fitted in between the card top layer and card bottom layer. The module element has an integrated electronic circuit for processing and/or storing personal data. A levelling compensating layer has a levelling material and is disposed or formed between the module element and the card top layer and/or the card bottom layer for filling existing cavities in the module element or between the module element and the card top layer and/or card bottom layer. The levelling compensating layer also fills or levels existing protruding elevations on a surface of the module element.

27 Claims, 2 Drawing Sheets

DATA CARD, PROCESS FOR MANUFACTURING A DATA CARD AND APPARATUS FOR MANUFACTURING A DATA CARD

CROSS-REFERENCE TO RELATED APPLICATION

This is a continuation of copending International Application PCT/DE97/00118, filed Jan. 23, 1997, which designated the United States.

BACKGROUND OF THE INVENTION

Field of the Invention

The invention relates to a data card, a process for manufacturing the data card (chip card) and an apparatus for manufacturing the data card. The data card is formed of a top card layer and a bottom card layer sandwiching a module element there between. The module element has integrated circuit elements for processing and storing personal data.

Such a data card and a corresponding process for its manufacture are disclosed, for example, by British Patent Application No. 2 279 907 A. The application teaches a sheathing element holding integrated circuits embedded between two card top layers of PVC and between two intermediate layers of polyester, the latter being coated on both sides with a thermally activatable adhesive. The intermediate layers serve for laminar reinforcement and consequently as a guard against the sheathing element breaking out of the PVC layers.

On account of their high functional flexibility, the application possibilities for data cards, generally configured in a check card format, have become extremely varied and, with the increasing computing power and storage capacity of the integrated circuits, are continuing to increase. In addition to the traditional fields of application for data cards in the form of health insurance cards, flex time registration cards, and phone cards, there will be future applications in the fields of electronic payment, computer access control, protected data memories and the like.

With regard to the method of coupling the data card to a terminal or a reader, a distinction is made between data cards with contacts and so-called contactless data cards. In the case of a data card with contacts, the electrical bonding takes place by a metallic contact area with contact elements which are usually standardized in accordance with an ISO standard. It is true that, on account of the increasing production experience of manufacturers, it has been possible for the reliability of the data cards with contacts to improve, so that for example the failure rate of phone cards over a service life of one year is less than one per thousand. However, as before, contacts are one of the most frequent sources of faults in electromechanical systems. Malfunctions may be caused, for example, by soiling or wearing of the contacts. If used in mobile equipment, vibrations may result in short-term contact interruptions. Since the contacts on the surface of the data card are connected directly to the inputs of the integrated circuit, there is, in addition, the risk of electrostatic discharges being able to weaken or even destroy the integrated circuit in the interior of the card.

These technical problems are obviated by the contactless data card. In addition to these technical advantages, the contactless data card also has a series of interesting new application possibilities for the card issuer and the card user. For example, contactless data cards do not necessarily have to be inserted into a card reader, but instead there are systems which operate over a range of up to one meter. A wide field of application is, for example, that of local public transport, where as many people as possible have to be registered in as short a time as possible. In addition to further advantages, the contactless data card has the benefit that no technical elements are visible on the card surface, so that the visual configuration of the card surface is not restricted by magnetic strips or contact areas. The disadvantages of the currently available contactless data cards are, in particular, associated with the additional components such as transmission coils or capacitor plates, which have to be integrated into the card. This has the result that, to date, the manufacture of contactless data ards is distinctly more expensive than the comparable cards with contacts. In addition, the electronics required in the contactless data card for the contactless transmission of electric signals to the terminal are more complex. Suitable in principle for this are circuits which permit signal transmission by microwaves, optical signals, capacitive or inductive coupling. The flat form of the data card is most compatible with capacitive and inductive coupling. At present, most contactless cards use inductive transmission devices, by which both data and energy transmission can be realized. Thus, one or more induction coils are integrated in the card body as coupling elements. The transmission of electric signals takes place on the principle of the loosely coupled transformer, the carrier frequency lying, for example, in the range between 100 and 300 kHz or at some MHz, in particular the radio frequency of 13.56 MHz. Required for this are induction coils having coil areas significantly greater than the base area of the semiconductor chip, of the order of magnitude of about 10 $mm^2$, and typically about 30 to 40 $cm^2$. The induction coils have to be electrically bonded in a suitable way to the circuit located on the semiconductor chip. In this case, the semiconductor chip is initially positioned, fixed and electrically bonded on an intermediate carrier.

Subsequently, for protection against environmental effects, an encapsulation is provided, preferably by a thermoset polymer composition. The carrier supporting the semiconductor chip, which is initially in the form of a separate component and is usually also referred to as a data (chip) module, is subsequently electrically bonded, preferably by welding, soft or hard soldering, to the induction coil. The induction coil generally has only few turns and is of a flat configuration, and the support is finally laminated into the card body to complete the data card.

The materials, the structural configuration and the manufacture of the card body of a data card are essentially determined by the functional elements of the card and also by the loading to which the card will be subjected to when in use. Currently customary materials for data cards are polyvinylchloride (PVC) which is the least expensive of all available materials and covers a wide range of use, acrylonitrile-butadiene-styrene (ABS) which is distinguished in particular by high strength and temperature resistance, and polycarbonate which permits a long service life but is more expensive. For manufacturing a data card, generally the laminating process is used, in which various films including outer films and inlet films of the data module, which are generally in the form of a separate, prefabricated component, are firmly welded to the card body. With this process, high demands for the quality of the bond between the data module and the card body can be met. It being virtually impossible for the chip to be detached from the card without destroying the latter. Usually, before being joined together, the outer films are provided with a recess which is produced by milling and into which the data module is adhesively fixed. To even out existing height differences of substructures of the data module and to fill cavities including recesses and holes which have been produced in advance by punching and/or milling and into which the data module can be inserted, use is made of intermediate layers of thermoplastic films. A disadvantage of laminating on such intermediate layers is that, on account of a multiplicity of available data (chip) modules with different dimensions and overall heights and with different configurations of the substructures, complete uniformity or evening out cannot be achieved in the mass production of data cards. In addition, the intermediate layers provided with recesses and openings for the purpose of height compensation require a certain manufacturing expenditure, which contributes to making the data cards produced in large numbers more expensive.

SUMMARY OF THE INVENTION

It is accordingly an object of the invention to provide a data card, a process for manufacturing the data card, and an apparatus for manufacturing the data card which overcome the above-mentioned disadvantages of the prior art devices and methods of this general type, in which a more simple, and consequently less expensive, assembly is used which takes into consideration production-dependent dimensional and positional tolerances, while at the same time providing high reliability and a long service life of the data card.

With the foregoing and other objects in view there is provided, in accordance with the invention, a data card, including: a card body having at least one card top layer and at least one card bottom layer with outer dimensions corresponding to one another; a module element with a surface and an integrated electronic circuit for processing and storing personal data, the module element is disposed between the at least one card top layer and the at least one card bottom layer; and a compensating layer including a levelling material is disposed between the module element and at least one of the at least one card top layer and the at least one card bottom layer, the levelling material being applied as one of a liquid and a virtually liquid consistency and is subsequently cured, the compensating layer filling in cavities existing in at least one of the module element, between the module element and the at least one card top layer, and between the module element and the at least one card bottom layer, and the compensating layer filling in cavities between the surface and protruding elevations on the surface of the module element.

The invention provides that, for evening out the height differences of substructures of the module element or of the card top layer and card bottom layer and for filling cavities within the module element or cavities between the module element and the card top layer and/or card bottom layer, there should be provided a levelling compensating layer of a levelling material. The compensating layer is disposed between the module element and the card top layer and/or the card bottom layer.

In keeping with the principle of the invention, the levelling material of the compensating layer is applied in liquid or at least virtually liquid consistency during the joining together of the card bottom layer, the card top layer the and module elements, and the compensating layer is subsequently cured. An essential feature of the levelling material is that, in the uncured state, it has a fluid behaviour with defined viscosity, in order to permit the filling of depressions and structures, for example through-holes and blind holes in the inlet carrier film of the module element, and of elevations of substructures of the module element, for example strip waveguides of an induction coil and thermoset mouldings. The special advantage is that production-related dimensional and positional tolerances can be compensated by the liquid phase of the levelling material. After application, the levelling material can be cured by heat or light radiation. If a UV-curing coating is used for the levelling material, durable curing, and consequently adequate mechanical strength, of the compensating layer can be achieved by brief irradiation by one or more light sources, preferably with wavelengths in the UV range. Preferably, in this case at least the portion of the card top layer and/or card bottom layer which is in contact with the module element is produced from a material which is transparent or at least translucent to the light radiation. Advantageously, in particular non-pigmented, highly amorphous, thin thermoplastic films are used for the card top layer and/or the card bottom layer of the card body.

To achieve the quickest possible polymerization, in particular UV-curing epoxys with cationic post-curing are suitable for the levelling material of the compensating layer. These epoxys fully cure, for example, in less than 60 seconds and are therefore suitable for the mass production of the data cards. The highly kinetic chemical conversions are caused by indicators, for example of $SbF_6$, which are in the epoxy and initiate the cationic process. Cationically UV-curing epoxy resins may be made available in one-component form, so that it is possible to dispense with laborious mixing of individual components. In comparison with this, pot lives are of secondary significance.

With regard to laminating advantages, the carrier layer intended for supporting the module element, which layer is disposed between the card top layer and card bottom layer, may consist of a thermoplastic material of the same material as the outer layers. In the case of a particularly preferred configuration, it is therefore provided that the material of the card top layer and/or card bottom layer and/or the carrier layer includes a thermoplastic material, in particular polyvinylchloride (PVC), polycarbonate (PC), polypropylene (PP), acrylonitrile-butadiene-styrene (ABS) and/or polyamide. For the case in which the carrier layer or film likewise consists of one of these thermoplastics, the UV-curing coating, as the levelling material of the compensating layer, should be adapted to the material of the carrier layer dilathermally, i.e. with regard to the relative change in spatial dimensions in response to a change in temperature to be observed in the case of solid bodies, in order to avoid bimorphic deformations upon heating or cooling of the card body, on account of different shaping properties.

The coefficient of linear expansion of ABS is about 100 ppm/K, of PVC is about 80 to 150 ppm/K, of PC is about 70 ppm/K and of PP is about 150 to 200 ppm/K. The highest coefficients of thermal expansion of one-component UV-curing epoxy resins are about 80 to 120 ppm/K, i.e. they lie somewhat below the values for the materials of the outer or carrier layers. All of the just quoted values are applicable to the temperature range from about 20 to 80° Celsius. In order to avoid deformation after the application and curing of the levelling material due to later heating or cooling of the card body, the material rigidity should be as low as possible. The material rigidity is characterized by the modulus of elasticity. Since the latter can be measured only with difficulty on thin layers of adhesive, the hardness may be taken as an indirect indication. The lowest hardness of these systems is Shore A 20 (as specified by DIN 53505). This value is set due to the additions of flexibilizers, for example polyols. They may be present in the same volume concentration as the resin of the levelling material.

To ensure that the liquid phase of the levelling material is not too runny and to avoid lateral overrun of the levelling material over the edges of the module element or carrier layer during application for preventing smearing of the laminating tool, the liquid phase of the levelling material may be provided with a thixotropic agent, for example with PA pastes and waxes, or with a thickener. Advantageous thickeners are Aerosils (registered trade mark) which consist of amorphous $SiO_2$.

In accordance with an added feature of the invention, the levelling material includes a coating material cured by light radiation with a wavelength, the at least one card top layer and the at least one card bottom layer has regions covering the module element and at least one of the regions is produced from a material selected from the group consisting of a transparent material and a material at least translucent to the light radiation.

In accordance with an additional feature of the invention, the coating material is cured by ultraviolet light radiation.

In accordance with another feature of the invention, the levelling material includes a UV-curing epoxy with cationic post-curability.

In accordance with a further added feature of the invention, the levelling material and a material of at least one of the at least one card top layer and the at least one card bottom layer are adapted dilathermally to each other.

In accordance with a further additional feature of the invention, at least one of the at least one card top layer and the at least one card bottom layer includes a thermoplastic material.

In accordance with another added feature of the invention, the thermoplastic material is selected from the group consisting of polyvinylchloride, polycarbonate, polypropylene, acrylonitrile-butadiene-styrene and polyamide.

In accordance with another additional feature of the invention, the levelling material includes at least one of a flexibilizing additive and a thickening additive.

In accordance with yet another feature of the invention, there is a carrier layer disposed between the at least card top layer and the at least one card bottom layer for supporting the module element.

In accordance with yet another added feature of the invention, the carrier layer includes a thermoplastic material.

In accordance with yet another additional feature of the invention, the thermoplastic material is selected from the group consisting of polyvinylchloride, polycarbonate, polypropylene, acrylonitrile-butadiene-styrene and polyamide.

In accordance with yet a further added feature of the invention, at least one of the at least one card top layer and the at least one card bottom layer has a recess formed therein for receiving at least part of the module element.

In accordance with yet a further additional feature of the invention, the module element has an integrated coupling element particularly an induction coil.

With the foregoing and other objects in view there is also provided, in accordance with the invention, a process for manufacturing a data card having a card body and a module element with an integrated electronic circuit for processing and storing personal data, the module element received within the card body, the process which includes: manufacturing a module element having a surface as a separate, independent component; producing at least one card top layer and at least one card bottom layer; joining together the at least one card top layer, the module element and the at least one card bottom layer to form a card body of a data card; and forming a compensating layer between the module element and at least one of the at least one card top layer and the at least one card bottom layer for filling in existing cavities in at least one of the module element, between the module element and the at least one card top layer, and between the module element and the at least one card bottom layer, the compensating layer filling in any existing protruding elevations on the surface of the module element, the forming step includes: using a levelling material in the compensating layer; applying the levelling material in one of a liquid and a virtually liquid consistency; and curing, subsequently, the levelling material.

With the foregoing and other objects in view there is further provided, in accordance with the invention, an apparatus for manufacturing a data card having a card body and a module element with an integrated electronic circuit for processing and storing personal data disposed within the card body, the apparatus including: a conveying device for feeding at least one card top layer and at least one card bottom layer for forming a card body; a joining device for bringing together and joining the at least one card top layer, the at least one card bottom layer and a module element; a dispensing and metering device disposed upstream from the joining device for introducing a compensating layer having a levelling material for filling cavities between the module element and the at least one card top layer and the at least one card bottom layer, and levels protruding elevations on a surface of the module element; and a curing device disposed downstream of the dispensing and metering device for curing the levelling material.

In accordance with an added feature of the invention, the curing device has a radiation source for emitting radiation with a wavelength.

In accordance with an additional feature of the invention, the radiation source emits radiation with a wavelength in an ultraviolet range.

In accordance with a concomitant feature of the invention, there is a recess-producing device for forming a recess in a portion of one of the at least one card top layer and the at least one card bottom layer for holding the module element.

Other features which are considered as characteristic for the invention are set forth in the appended claims.

Although the invention is illustrated and described herein as embodied in a data card and process for manufacturing the data card, and also an apparatus for manufacturing the data card, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

DESCRIPTION OF THE PREFERRED
EMBODIMENTS

Figure 1:
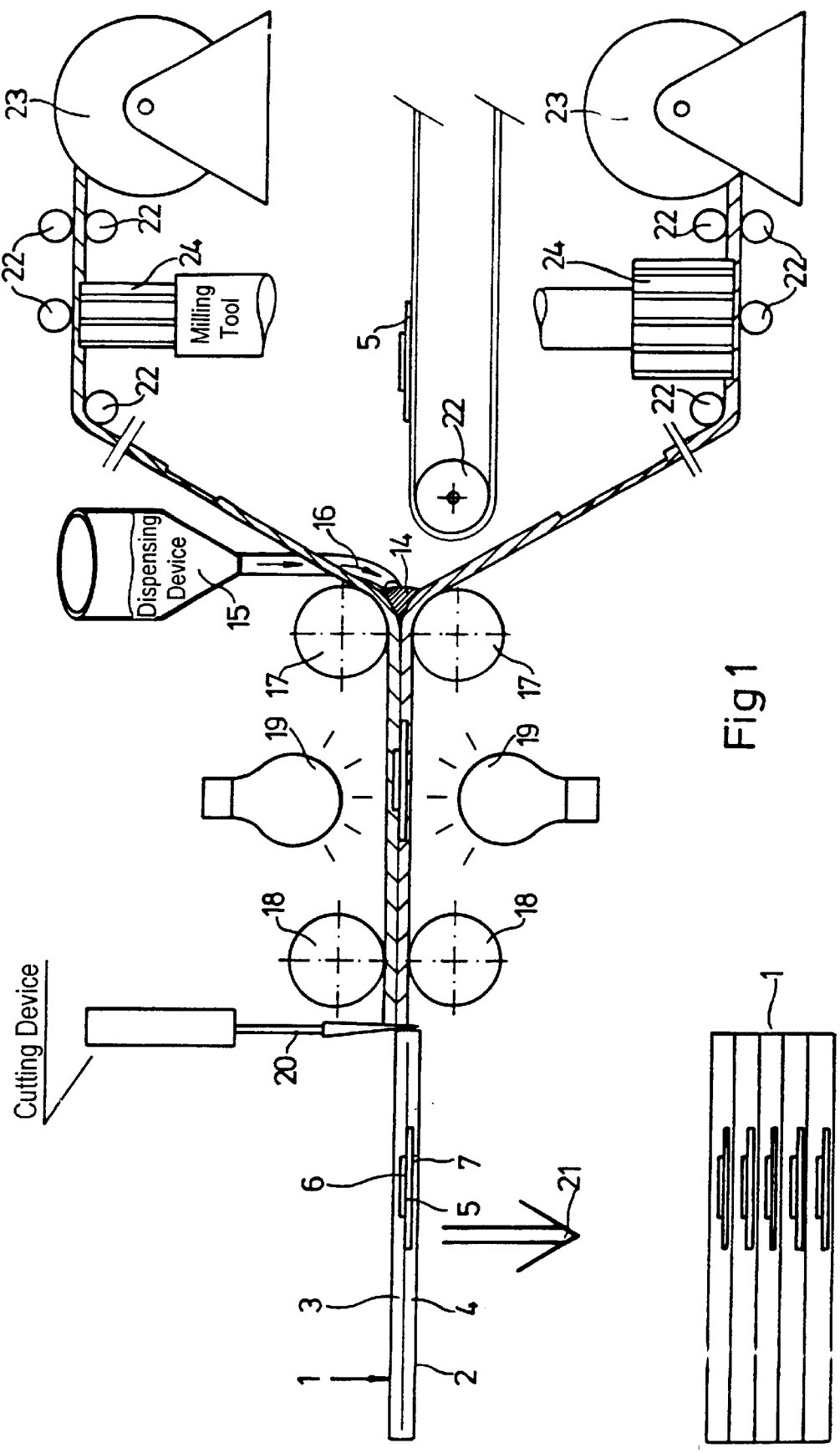
FIG. 1 is a diagrammatic view of an apparatus for manufacturing data card according to the invention.
Figure 2:
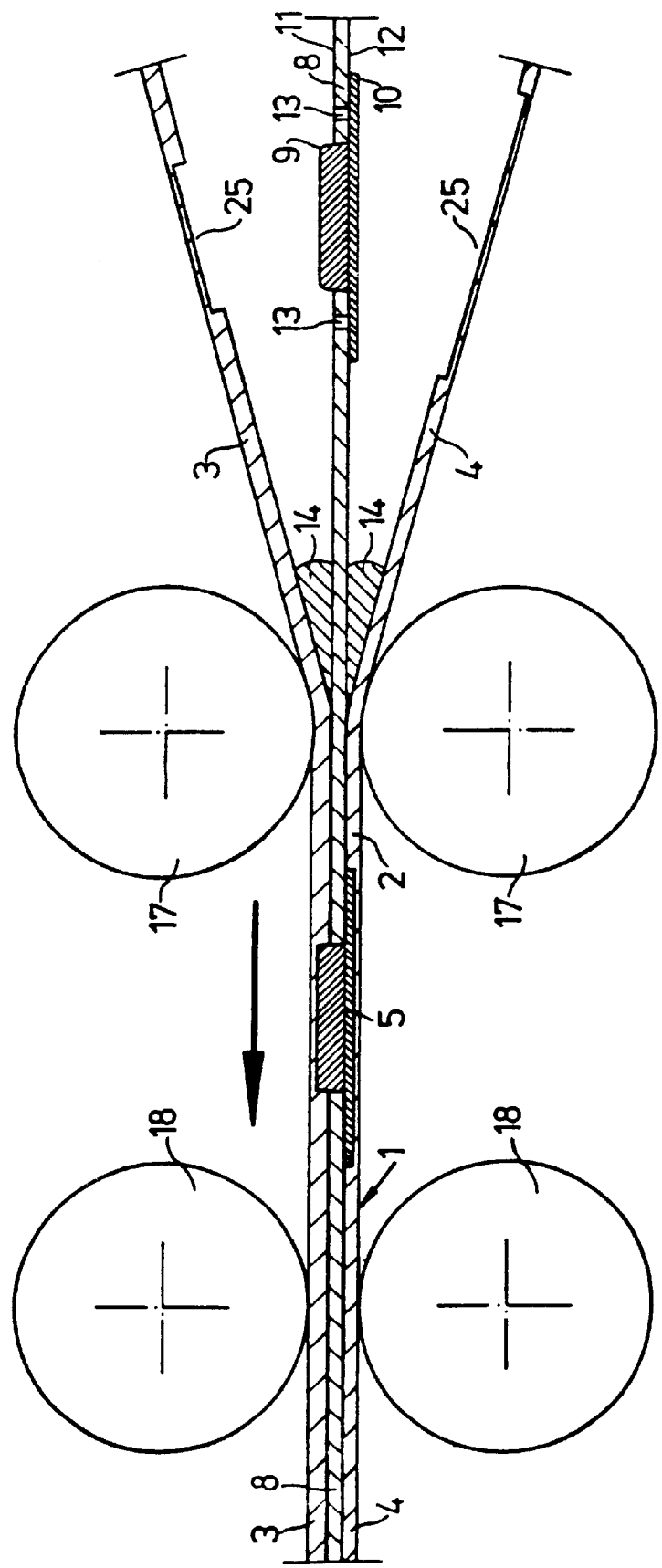
FIG. 2 is a diagrammatic partial view of a second embodiment of the apparatus for manufacturing the data card.

Referring now to the figures of the drawing in detail and first, particularly, to FIGS. 1 and 2 thereof, there are shown diagrammatic representations of an apparatus and process according to the invention for manufacturing a data card 1, including a card body 2. The card body 2 has at least one card top layer 3 and at least one card bottom layer 4. The outer dimension s of the top and bottom card layers 3, 4 correspond to one another. The card body 2 also includes a module element 5, which is fitted between the card top layer 3 and the card bottom layer 4 within the card body 2 and has an (only diagrammatically indicated) integrated electronic circuit 6 for processing and/or storing personal data. The module element 5 is produced as an independent, separate component in a way known per se and includes, in addition to the integrated electronic circuit 6. Further components, which are not explicitly represented, in particular a thermoset moulding, having a coupling element 7, in particular an induction coil with coil turns produced in strip form are connected to the electronic circuit 6. In the case of a second exemplary embodiment according to FIG. 2, the separately produced module element 5 may, in addition, have in particular a carrier film 8, which is firmly connected to the other component parts of the module element 5 and serves for the mechanical support of, in particular, the induction coil 7. In any case, the module element 5 has elevations 9, 10, only diagrammatically indicated in the figures, with respect to a reference surface 11, 12 of the module element 5 and also cavities and depressions, for example on account of through-holes or blind holes in the carrier film 8, which are likewise only diagrammatically indicated in FIG. 2 by the reference numeral 13. The true geometrical dimensions of such elevations 9, 10 and cavities or depressions 13 present in the module element 5 are significantly smaller than can be represented in FIGS. 1 and 2. For filling the existing cavities or depressions 13 and for evening out the elevations 9 and 10, a levelling material 14 in an essentially liquid or at least flowable consistency is introduced in a metered manner from a dispensing or metering device 15 in the direction of arrows 16 (see FIG. 1) during the joining process of the card top layer 3 and the card bottom layer 4 with the module element 5 disposed in between. The levelling material 14 fills all of the cavities 13 and the elevations 9, 10 caused by the substructures of the module element 5 between the card top layer 3 and the card bottom layer 4. The introduction of the levelling material 14 takes place, as diagrammatically represented, immediately upstream of the laminating stage, in which the layers 3, 4 and the module element 5 are welded together under pressure, by preferably heatable pairs of laminating rollers 17, 18, to produce the card body 2.

In the case of the exemplary configuration, the levelling material 14 may be in the form of a UV-curing coating and may have the following composition and physical properties:

Composition

| Resin, for example cycloaliphatic | 20–40% |
|---|---|
| Flexibilizer | 20–50% |
| Photoinitiator | >0.5 |
| Thickener | ≦10% |
| PA paste | ≦10% |

Physical Properties

| Viscosity (at 20° Celsius) | 9,000–15,000 mPas |
|---|---|
| Curing time (at UVA 90 mW/cm²) | ≦30 s |
| Hardness | 100 Shore A |
| Temperature resistance | ≧150° Celsius |
| Thermal expansion | 80–120 ppm/K |

For the subsequent curing of the levelling material 14, a brief period of irradiation takes place with light of a suitable wavelength. This is produced by a suitable light source, diagrammatically indicated by reference numeral 19. To accelerate the curing process, heating stages (not represented in any more detail) may be disposed downstream.

In the cutting device, diagrammatically indicated by reference numeral 20, the individual data cards 1 are severed and may subsequently be deposited in a collecting container or the like, according to arrow 21.

The exemplary embodiments represented in FIGS. 1 and 2 show by way of example the manufacture of the card body 2 of the data card 1 for the punctaform application of the flowable levelling material 14 at a point immediately upstream of the first pair of laminating rollers 17, i.e. application of the levelling material roller-to-roller. By contrast, it is likewise conceivable and in keeping with the principle of the invention to provide the material introduction of the levelling material 14 by using a sheet-like layer of the levelling material thinly applied upstream of the laminating stage.

In the case of the exemplary embodiments represented, the feeding of the card top layer 3 and the card bottom layer 4 takes place by conveying rollers 22 in endless form from supply rolls 23. It being possible for diagrammatically indicated milling tools 24 to be provided for forming recesses 25 at a predetermined position of the card top layer 3 and the card bottom layer 4. The recesses 25 are configured for receiving at least part of the module element 5. The invention may, however, also be successfully used in the production of data cards 1 by the sheet technique, in which the individual layers 3, 4 are fed in and welded to one another as sheet laminates.

We claim:

1. A data card, comprising:
    a card body having an upper card layer and a lower card layer with outer dimensions corresponding to one another;
    a module element having a surface and an integrated electronic circuit for processing and storing personal data, said module element disposed between said lower card layer and said upper card layer; and
    a level compensating layer including a levelling material disposed between said module element and at least one of said card layers, said levelling material applied as a substance having one of a liquid and a virtually liquid consistency and subsequently cured, said compensating layer filling in cavities existing between said module element and at least one of said card layers, and said compensating layer filling in cavities between at least one of said card layers and protruding elevations on said surface of said module element;
    wherein said levelling material and a material of at least one of said upper card layer and said lower card layer are adapted dilathermally to each other.

2. The data card according to claim 1, wherein said levelling material includes a coating material cured by light radiation with a wavelength, said at least one top card layer and said at least one bottom card layer have regions covering said module element and at least one of said regions is produced from a material selected from the group consisting of a transparent material and a material at least translucent to the light radiation.

3. The data card according to claim 2, wherein said coating material is cured by ultraviolet light radiation.

4. The data card according to claim 1, wherein said levelling material includes a ultraviolet-curing epoxy with cationic post-curability.

5. The data card according to claim 1, wherein at least one of said card layers includes a thermoplastic material.

6. The data card according to claim 5, wherein said thermoplastic material is selected from the group consisting of polyvinylchloride, polycarbonate, polypropylene, acrylonitrile-butadiene-styrene and polyamide.

7. The data card according to claim 1, wherein said levelling material includes at least one of a flexibilizing additive and a thickening additive.

8. The data card according to claim 1, including a carrier layer disposed between said card layers for supporting said module element.

9. The data card according to claim 8, wherein said carrier layer includes a thermoplastic material.

10. The data card according to claim 9, wherein said thermoplastic material is selected from the group consisting of polyvinylchloride, polycarbonate, polypropylene, acrylonitrile-butadiene-styrene and polyamide.

11. The data card according to claim 1, wherein said module element has an integrated coupling element.

12. The data card according to claim 11, wherein said integrated coupling element is an induction coil.

13. The data card according to claim 1, wherein at least one of said card layers is formed with a recess for receiving at least part of said module element, and said integrated electronic circuit is completely covered in an upper direction by said upper card layer and is completely covered in a lower direction by said lower card layer.

14. A process for manufacturing a data card, which comprises:

manufacturing a module element having an integrated electronic circuit for processing and storing personal data and a surface as a separate, independent component;

producing at least one top card layer and at least one bottom card layer;

joining together the at least one top card layer, the module element and the at least one bottom card layer to form a card body;

forming a level compensating layer between the module element and at least one of the card layers for filling existing cavities in at least one of the module element and between the module element and at least one of the card layers, and filling in any existing protruding elevations on the surface of the module element with the compensating element; and carrying out the forming step as the top card layer and the bottom card layer are being joined together by:

using a levelling material in the compensating layer;

applying the levelling material in one of a liquid and a virtually liquid consistency; and subsequently, curing, the levelling material.

15. The process according to claim 14, which comprises:

including a coating material in the levelling material;

curing the coating material with light radiation having a wavelength; and producing at least one of the card layers from a material selected from the group consisting of a transparent material and a material at least translucent to the light radiation.

16. The process according to claim 15, which comprises performing the curing step with ultraviolet light radiation.

17. The process according to claim 14, which comprises adding a ultraviolet-curing epoxy with cationic post-curability to the levelling material.

18. The process according to claim 14, which comprises dilathermally adapting the levelling material and a material of at least one of the card layers to each other.

19. The process according to claim 14, which comprises producing at least one of the card layers with a thermoplastic material.

20. The process according to claim 19, which comprises selecting the thermoplastic material from the group consisting of polyvinylchloride, polycarbonate, polypropylene, acrylonitrile-butadiene-styrene and polyamide.

21. The process according to claim 14, which comprises adding at least one of a flexibilizing additive and a thickening additive to the levelling material.

22. The process according to claim 14, which comprises disposing a carrier layer between the card layers for supporting the module element.

23. The process according to claim 22, which comprises producing the carrier layer with a thermoplastic material.

24. The process according to claim 23, which comprises selecting the thermoplastic material from the group consisting of polyvinylchloride, polycarbonate, polypropylene, acrylonitrile-butadiene-styrene and polyamide.

25. The process according to claim 14, which comprises forming a recess in at least one of the card layers for receiving at least part of the module element.

26. The process according to claim 14, which comprises manufacturing the module element with an integrated coupling element.

27. The data card according to claim 26, which comprises manufacturing the integrated coupling element as an induction coil.

* * * * *